No. 837,975.
PATENTED DEC. 11, 1906.
H. H. SUTRO & L. M. BOOTH.
APPARATUS FOR TREATING LIQUIDS.
APPLICATION FILED JUNE 30, 1905.
2 SHEETS—SHEET 1.
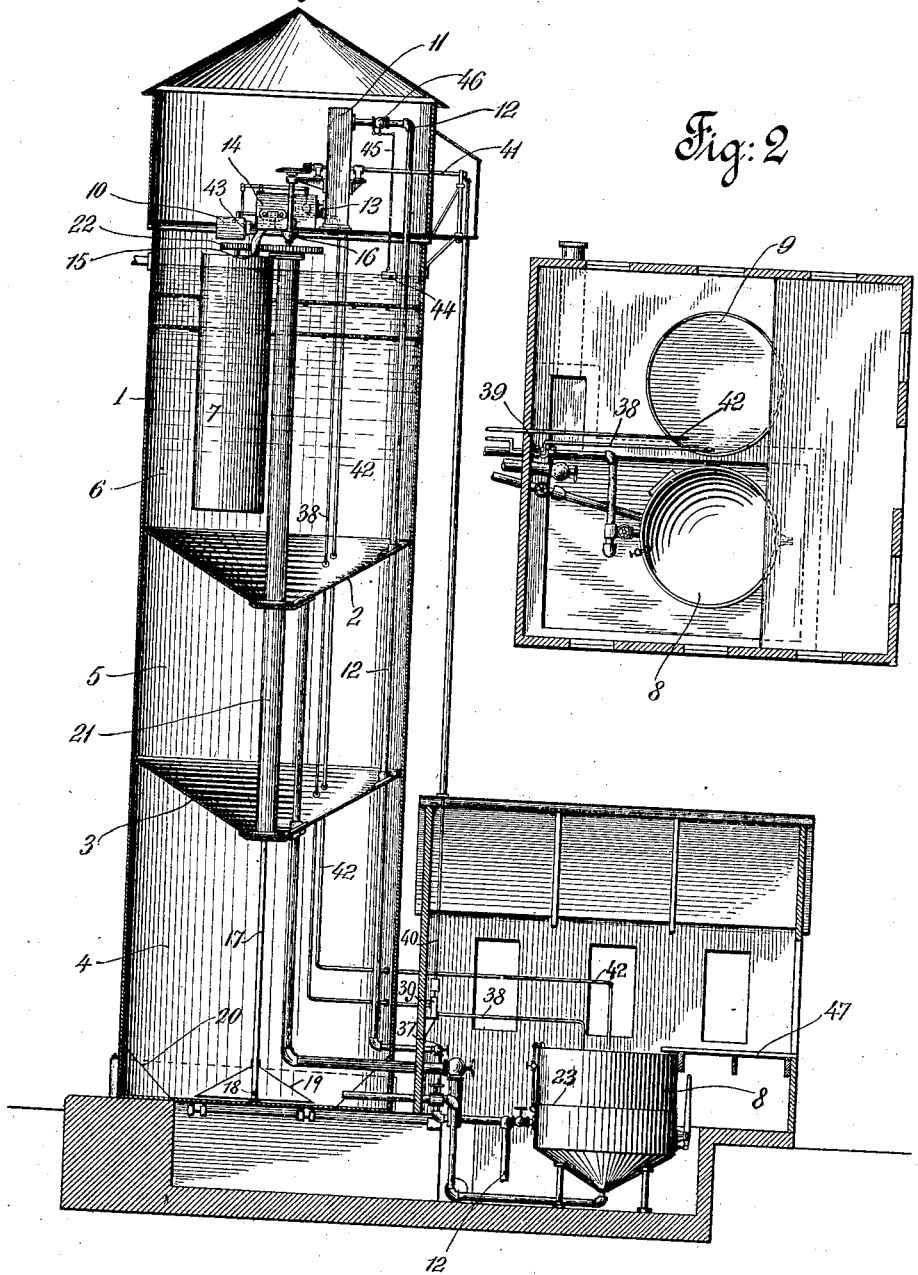
Witnesses
Egbert Nelson
E. Quinn.
Harry Herbert Sutro
Lewis Miller Booth, Inventors
By their Attorney Henry M. Brigham No. 837,975.
PATENTED DEC. 11, 1906.
H. H. SUTRO & L. M. BOOTH.
APPARATUS FOR TREATING LIQUIDS.
APPLICATION FILED JUNE 30, 1905.
2 SHEETS—SHEET 2.
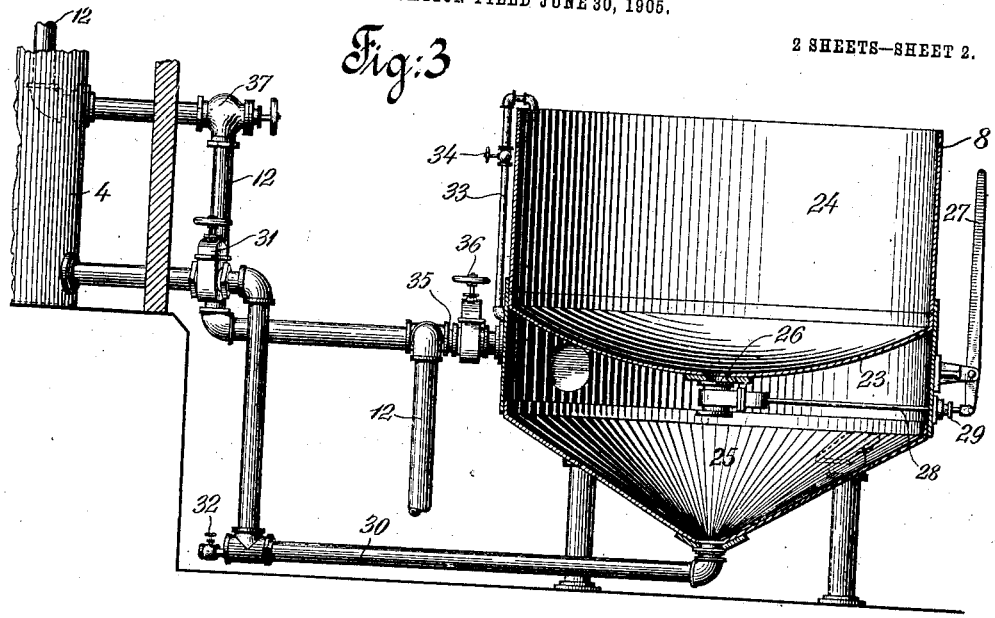
Fig: 3
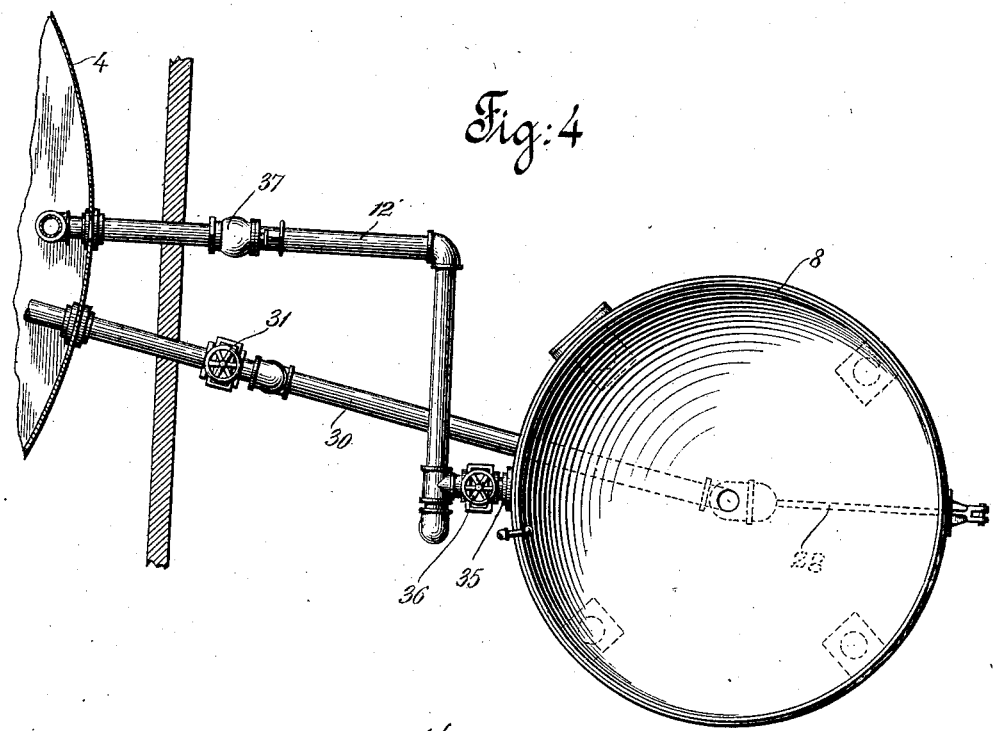
Fig: 4
Witnesses
Harry Herbert Sutro
Lewis Miller Booth
Inventors
By their Attorney Henry M. Brigham

UNITED STATES PATENT OFFICE.

HARRY HERBERT SUTRO, OF NEW YORK, N. Y., AND LEVIS MILLER BOOTH, OF PLAINFIELD, NEW JERSEY.

APPARATUS FOR TREATING LIQUIDS.

No. 837,975.     Specification of Letters Patent.     Patented Dec. 11, 1906.

Application filed June 30, 1905. Serial No. 267,693.

*To all whom it may concern:*

Be it known that we, HARRY HERBERT SUTRO, of the borough of Manhattan, in the city, county, and State of New York, and LEVIS MILLER BOOTH, of Plainfield, in the county of Union and State of New Jersey, (whose post-office addresses are No. 126 Liberty street, in the said borough of Manhattan, New York city, New York,) have invented certain new and useful Improvements in Apparatus for Treating Liquids, of which the following is a specification.

The object of our invention is to provide a simple and effective apparatus for treating liquids with chemical reagents, and the particular features of our invention are described in the following specification and pointed out in the appended claims.

In the accompanying drawings, Figure 1 is a side view of our apparatus, partly in section. Fig. 2 is a plan view of the charging or main tanks or receptacles from which chemicals are supplied to the regulating tanks or receptacles contained within the apparatus. Fig. 3 is a side view, partly in section, of one of the charging or main tanks or receptacles. Fig. 4 is a plan view of the tank or receptacle shown in Fig. 3.

1 is the principal tank-shell of the apparatus, which is divided into separate compartments by means of the partitions 2 and 3.

4 is the lime-water tank.

5 and 6 are settling-tanks; 7, the reaction-tank; 8, the main lime tank or holder, in which the lime is slaked and from which the lime-water tank is charged with lime; 9, the main soda-solution or chemical-reagent tank or holder, from which the auxiliary chemical-reagent tank 10 is supplied with chemical reagent and from which latter the chemical reagent is supplied to the reaction-tank in proper proportion to the raw water which is to be treated therein.

11 is the wheel-box, to which raw water is supplied by means of the supply-pipe 12, and contains a water-wheel similar to that described in United States Letters Patent to Harry Herbert Sutro, dated July 19, 1904, and numbered 765,259, for improvement in apparatus for purifying water and which, therefore, it is not necessary to describe in detail. From the wheel-box 11 the water flows through the pipe 13 into the box 14, from which it is discharged, a portion flowing through the pipe 15 into the reaction-tank 7 and the other portion into the funnel 16 and through the pipe-shaft 17, by which it is discharged into the bottom of the lime-water tank 4 through openings 18 in the lower end of said pipe-shaft. To the lower end of the pipe-shaft 17 is attached a hollow cone 19, so arranged that the lower edges are adjacent to the bottom of the lime-water tank 4. To the inside wall of the lime-water tank 4 and near the bottom thereof is attached a funnel-shaped metallic ring 20.

21 is a pipe surrounding the pipe 17, with an annular space between the two, the lower end thereof opening into the tank 4 and permitting the lime-water to rise and overflow through the spout 22 into the reaction-tank 7. The lime-charging tank or main lime-holder 8, as shown in Fig. 3, is provided with a partition 23, which divides the same into an open compartment or vat 24 and an inclosed compartment 25. The partition 23 is provided with a valve 26, adapted to be opened and closed by means of the lever 27 and the connecting-rod 28, which passes through the stuffing-box 29.

30 is a pipe leading from the bottom of the compartment 25 to the lime-water tank 4 and is provided with a valve 31, also with a valve 32, which can be opened for the purpose of draining the compartment 25.

33 is a pipe communicating with the compartment 25, provided with a discharge-outlet into the compartment 24 and a valve 34.

35 is a pipe connected with the main supply-pipe 12 and communicating with the compartment 25 and provided with a valve 36. The pipe 12 is also provided with a valve 37.

38 is a pipe the lower and open end of which is located within and near the bottom of the open main soda-solution or chemical-reagent tank 9.

39 is a pump interposed in the pipe 38 and which is operated by means of the connecting-rod 40 and the crank-shaft 41, which is rotated by the water-wheel contained in the box 11. The upper end of the pipe 38 discharges into the auxiliary chemical-reagent holder 10.

42 is an overflow-pipe communicating with the auxiliary chemical-reagent tank 10, by means of which any excess of chemical-reagent solution pumped into the tank 10 through the pipe 38 is discharged and returned to the main charging-tank 9 and the chemical-reagent solution maintained at a uniform level in the tank 10. The chemical reagent is discharged from the tank 10 into the reaction-tank 7 by means of the gate 43 in the side of the tank, and such gate is opened and closed by means of a ball-float contained within the tank 14, but which is not shown nor described, as it is of the ordinary construction—as, for instance, like those shown in the patent issued to Harry Herbert Sutro, dated July 19, 1904, and numbered 765,259.

44 is a float contained in the tank 6 and is attached to a rod 45, which operates a valve 46, which closes the pipe 12, supplying raw water to the wheel-box 11 when the treated water in the settling-tank 6 has risen to a predetermined height and which opens as the water in the tank 6 falls and again automatically starts the apparatus.

47 is a platform arranged just above the level of the tanks 8 and 9.

The operation of our invention is as follows: Suitable chemicals are introduced into the tank 9 and dissolved by the addition of the proper amount of water or other liquid, so as to form a solution of predetermined strength. Lime is then introduced into the tank 24. The valves 34 and 36 are then opened, causing water to flow into the compartment 25 and through the pipe 33 into the compartment 24 until a suitable amount of water has been introduced into the compartment 24 to reduce the contents to milk of lime. The valve 36 is then closed and the valve 32 opened and the contents of the compartment 25 are drawn off. The valve 32 is then closed and the valve 26 opened, causing the contents of the compartment 24 to be discharged into the compartment 25, the pipe 33 acting as an air-vent. The valves 34 and 26 are then closed, and the valves 31 and 36 are opened, the flow of water under the pressure from the main supply-pipe 12 forcing the milk of lime contained within the compartment 25 through the pipe 30 into the bottom of the lime-water tank 4. During this operation it is preferable to close the valve 37, although it is unnecessary to do so if the water is supplied under sufficient pressure, as the discharge-opening into the wheel-box 11 is higher than the discharge-opening of the lime-water tank 4. The chemical reagent contained in the tank 9 is forced through the pipe 38 by means of the pump 39 to the auxiliary tank 10. The capacity of the pump 39 is such that a greater amount of chemical reagent is constantly pumped into the tank 10 than can be discharged through the outlet-gate into the reaction-tank 7. When the level of the reagent solution has risen to the overflow-port communicating with the pipe 42, all the excess is discharged into the pipe 42 and returned to the tank 9. When the water has risen to a predetermined height in the tank 6, the valve 46 is closed by the float 44, and the operation of the entire apparatus is automatically suspended. As the purified water is drawn from the tank 6 and the level therein lowered the valve 46 is automatically opened and the apparatus again automatically caused to operate. The operation of the apparatus can also be suspended by closing the valve 37 or by discontinuing the supply of raw water to the wheel-box 11. When the milk of lime has been introduced into the lime-water tank 4, the small particles of lime will be held in suspension near the bottom thereof and in the space between the hollow cone 19 and the funnel-shaped metallic ring 20, and as the water is fed into this tank through the pipe-shaft 17 and emerges through the openings 18 it will gradually flow out under the lower edge of 19 and be forced to percolate through the considerable depth of lime particles which are suspended in the annular space between 19 and 20.

The construction described permits a much greater vertical depth for the layer of lime particles than could be obtained in a flat-bottom tank with an equal amount of lime contained therein and insures that all the water which comes into the lime-water tank will be fed through a considerable mass of fine particles of lime and will become thoroughly-saturated lime-water as it rises to the top of the tank and before it is discharged into the reaction-tank. The pipe-shaft 17 is revolved by the gear-wheel at the upper end thereof, and this causes the hollow cone 19 to also revolve and gently agitate the particles of lime and water which are in contact with it, thereby insuring the constant even flow of the water discharged into 19 through the openings 18, upward around the lower edge of 19, and preventing the formation of any passage-ways of considerable size through the mass of lime particles which would prevent the thorough saturation of the water which passes upward through the lime. It is necessary, however, that the upper part of the lime-water tank should be of sufficient diameter so that the water as it rises to the upper part of the tank will flow slowly and be subject to but slight agitation in order that the particles of lime which are held in suspension after the water has passed through the layer of lime at the bottom of the tank may not be carried to the upper part of the tank and that only clear thoroughly-saturated lime-water shall be delivered from the upper part of the lime-water tank to the reaction-tank. This we accomplish by the construction described. The platform 47 is arranged at the proper height for discharging upon it the contents of the trucks or other vehicles used for the transportation of lime and other chemical reagents for use in the apparatus.

Having described our invention, what we claim as new, and desire to secure by Letters Patent, is—

1. In water-purifying apparatus the combination of a lime-water tank with a main lime-tank, means for introducing lime into the main lime-tank, a pipe communicationg between the main lime-tank and the raw-water-supply pipe and a pipe communicating between the main lime-tank and the lime-water tank, constituting means whereby the contents of the main lime-tank can be forced into the lime-water tank, substantially as and for the purposes described.

2. In apparatus for treating liquids the combination with a chemical-reagent tank of a main reagent-tank, means for introducing reagent into the main tank, a pipe forming a communication between the reagent-tank and the main tank and a pipe communicating with the main tank and the source of supply of liquid to the apparatus, constituting means whereby the contents of the main tank can be forced into the chemical-reagent tank, substantially as and for the purposes described.

3. In water-purifying apparatus, a main-supply lime-tank consisting of an open vat and an inclosed tank, an opening from the open vat into the inclosed tank and means for closing such opening, a conduit leading from the inclosed tank to the lime-water tank and a conduit connecting the inclosed tank with the conduit which supplies raw water to the apparatus, substantially as and for the purposes described.

4. In apparatus for treating liquids the combination with a chemical-reagent tank communicating with the atmosphere, of a pressure-vat serving as a main supply-tank and communicating with the chemical-reagent tank, means for introducing reagent into the main tank and means for forcing the contents of the main tank into the chemical-reagent tank, substantially as and for the purposes described.

5. In water-purifying apparatus an open vat and an inclosed tank communicating one with the other and means for interrupting said communication, a lime-water tank, means of communication between the inclosed tank and the lime-water tank, and means of communication between the inclosed tank and a conduit adapted to convey water under pressure, substantially as and for the purposes described.

Signed at the city of New York, in the county and State of New York, this 29th day of June, 1905.

HARRY HERBERT SUTRO.
LEVIS MILLER BOOTH.

Witnesses:
EGBERT V. NELSON,
E. QUINN.